(12) United States Patent
Hong et al.

(10) Patent No.: US 7,554,701 B2
(45) Date of Patent: Jun. 30, 2009

(54) SCANNER

(75) Inventors: Min-Wen Hong, Rende Township, Tainan County (TW); Tsung-Te Lin, Taipei (TW); Chun He, Su-chou (CN)

(73) Assignee: Qisda Corporation, Taoyuan County (TW)

( * ) Notice: Subject to any disclaimer, the term of this patent is extended or adjusted under 35 U.S.C. 154(b) by 1034 days.

(21) Appl. No.: 10/876,220

(22) Filed: Jun. 24, 2004

(65) Prior Publication Data

US 2004/0263917 A1 Dec. 30, 2004

(30) Foreign Application Priority Data

Jun. 24, 2003 (CN) .............................. 92 1 17092

(51) Int. Cl.
*H04N 1/04* (2006.01)

(52) U.S. Cl. .................. 358/474; 358/497; 358/498; 358/496

(58) Field of Classification Search ........... 358/474, 358/497, 498, 496, 471, 505, 482, 483, 513, 358/514; 359/896; 250/208.1, 239; 382/312; 399/211

See application file for complete search history.

(56) References Cited

U.S. PATENT DOCUMENTS

| 5,251,072 | A | * | 10/1993 | Fukuoka et al. ............. 359/896 |
| 5,999,277 | A | | 12/1999 | Tsai |
| 6,137,106 | A | | 10/2000 | Kao |
| 6,424,435 | B1 | * | 7/2002 | Kao ............................ 358/497 |
| 6,631,014 | B1 | * | 10/2003 | Aoshima et al. ............ 358/497 |
| 6,762,864 | B2 | * | 7/2004 | Kao ............................ 358/497 |
| 6,888,651 | B2 | * | 5/2005 | Lee ............................. 358/497 |
| 7,136,203 | B2 | * | 11/2006 | Yokota et al. ............. 250/208.1 |
| 7,158,270 | B2 | * | 1/2007 | Sheng et al. ................ 358/497 |
| 7,161,716 | B1 | * | 1/2007 | Kawasaki et al. ........... 358/497 |
| 7,180,641 | B2 | * | 2/2007 | Chang et al. ................ 358/497 |
| 7,218,427 | B2 | * | 5/2007 | Hirayama ................... 358/497 |

FOREIGN PATENT DOCUMENTS

| TW | 348919 | 12/1998 |
| TW | 524410 | 3/2003 |

* cited by examiner

*Primary Examiner*—Houshang Safaipour

(57) ABSTRACT

A scanner, including a contact image sensor module and an elasticity-providing element, is provided. When scanning, the elasticity-providing element is capable of avoiding vertical shift of contact image sensor module resulting from mechanical friction or other unexpected. Therefore, the contact image sensor module can retrieve clear images all the time.

13 Claims, 8 Drawing Sheets

SCANNER

CROSS-REFERENCE TO RELATED APPLICATION

This application claims priority to Taiwan Patent Application No. 092117092 filed on Jun. 24, 2003.

FIELD OF INVENTION

The present invention relates to a scanner, in particular a scanner including an elastic support element.

BACKGROUND OF THE INVENTION

Contact image sensor (CIS) scanners are popular computer peripheral devices. They are used for scanning documents or pictures. The conversion results are stored in a digital format or further processed by computers.

The CIS module usually includes a light source, a lens for focusing, an image sensor and a carriage. Since the focal distance of the CIS module is merely 0.3 mm, only documents or pictures within this distance will be clearly scanned. Once the object is outside that range, the scanned image will be blurred. Please refer to FIG. 1. Because of the strict limit, the image sensor 104 may not be able to retrieve clear images if there is a vertical movement brought about by the unevenness of guiding shaft 200 or other mechanical reasons when the carriage 108 moves along the guiding shaft 200. In order to solve this problem, it is known in the conventional techniques that an elastic element 202 is disposed between the carriage 108 and the image sensor 104 to absorb any forces that cause undesirable movement.

However, the limited space between the carriage 108 and the image sensor 104 restricts the size and the elasticity of the elastic element 202, which in turn limit the lifetime of the CIS scanner.

SUMMARY OF THE INVENTION

The present invention provides a CIS scanner including a window glass, a contact image sensor module, a carriage, a guiding shaft and a force-providing element. The documents or the pictures are placed on the window glass. The contact image sensor module is located below the window glass for scanning the image on the documents or the pictures. The carriage carries the contact image sensor module and has at least a hole. The guiding shaft is located below the carriage and movably connected to the carriage for horizontally guiding the carriage in use. The force-providing element includes an elastic part passing through the hole and touches against the contact image sensor module. The force-providing element provides a force making the contact image sensor module maintain a constant distance from the window glass to avoid retrieving blurry images caused by any undesirable movement while the contact image sensor module moves.

The CIS scanner of the present invention further includes a smooth element, positioned between the contact image sensor module and the window glass, for facilitating movement of the CIS module.

The force-providing element may include a helical unit movably sleeved into the guiding shaft. At least an elastic part is an extension unit from one end of the helical unit for supporting the contact image sensor module.

The force-providing element may further include a spacing element sleeved into the guiding shaft for facilitating movement of the guiding shaft along an axle direction of the helical unit.

There are still many other variants for the force-providing element. For example, the force-providing element may include an arc-shaped structure for seating on the guiding shaft. The elastic part may be a resilient element for supporting the contact image sensor module.

DETAILED DESCRIPTION

The CIS scanner of the present invention utilizes a force-providing element to maintain the contact image sensor module at a constant distance from the window glass while the contact image sensor module moves. The force-providing element may include a helical unit movably sleeved into the guiding shaft. An elastic part is an extension unit from one end of the helical unit for supporting the contact image sensor module.

Figure 1:
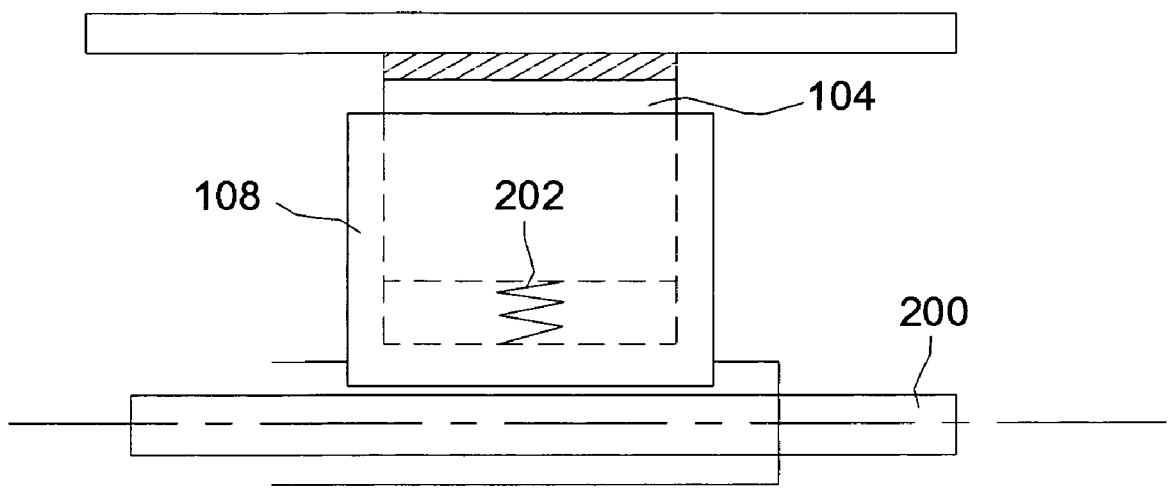
FIG. 1 is a cross-sectional view of a conventional CIS scanner.
Figure 2:
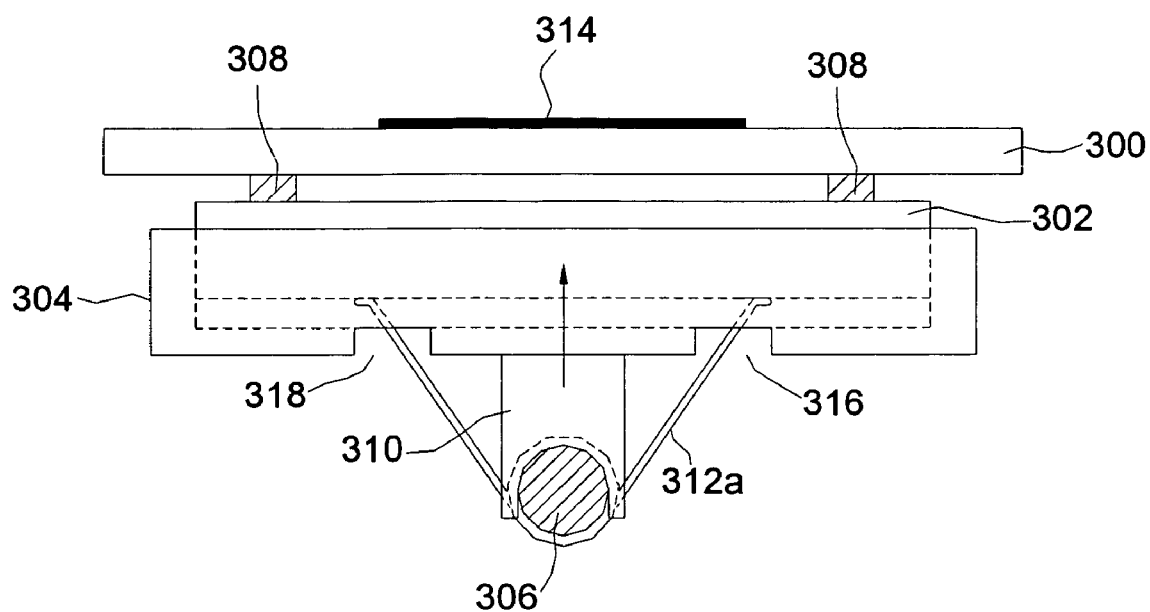
FIG. 2 is a side view of the first embodiment of the present invention.

The first embodiment of the present invention, shown in FIG. 2, includes a window glass 300, a contact image sensor module 302, a carriage 304, a guiding shaft 306, two smooth elements 308, a guiding element 310 and a force-providing element 312a. The documents or the pictures 314 are placed on the window glass 300. The contact image sensor module 302 including a contact image sensor (not shown) is located below the window glass 300 for retrieving the images on the documents or the pictures 314. The carriage 304 carries and accommodates the contact image sensor module 302 and has two holes 316 and 318. The guiding shaft 306 is located below the carriage 304 for guiding the movement of the carriage 304. The two smooth elements are positioned between the carriage 304 and the window glass 300 for facilitating the movement of the CIS module. The guiding element 310 is positioned at the bottom of the carriage 304 as a connecting interface for movably accommodating the guiding shaft 306.

Figure 3A:
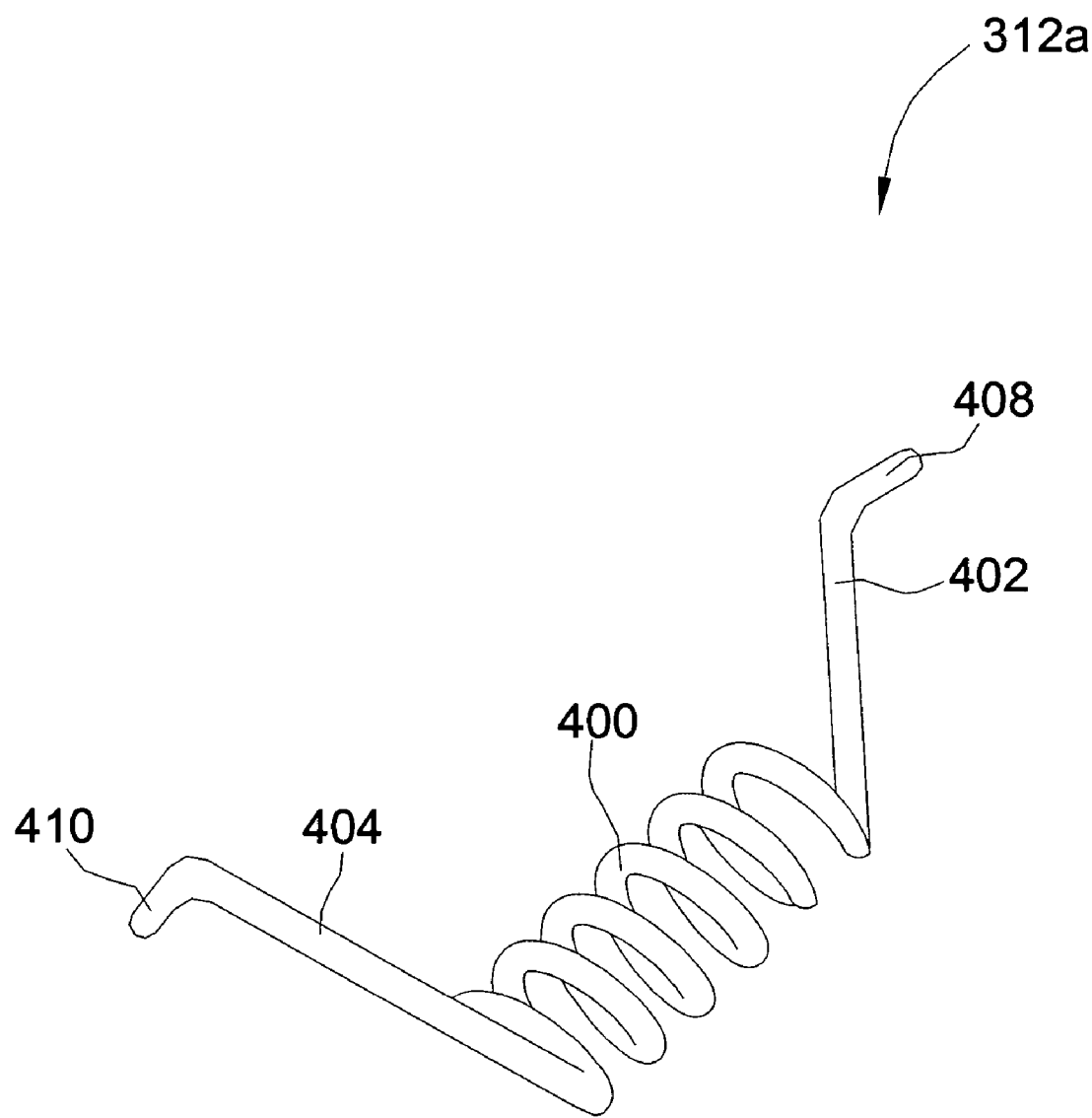
FIG. 3A is a perspective view of the force-providing element of the first embodiment of the present invention.

The force-providing element 312a in the first embodiment shown in FIG. 2 is a torsion spring. Torsion spring 312a includes a helical unit 400, two extension units 402 and 404 and two fixed units 408 and 410, as illustrated in FIG. 3A. The inner diameter of the helical unit 400 is slightly larger than that of the guiding shaft 306 so that the guiding shaft 306 can be movably sleeved into the helical unit 400. Two extension units 402 and 404 each pass through the holes 316 and 318 in FIG. 2 to support the contact image sensor module 302 by using two fixed units 408 and 410. Even though the horizontal movement of the carriage 304 may cause the carriage 304 and the contact image sensor module 302 to vibrate, the elastic force provided by the two extension units 402 and 404 along the direction shown in FIG. 2 maintains the contact image sensor module 302 at a constant distance from the window glass 300 at all times to make sure the object to be scanned is within the limited focal distance.

Figure 3B:
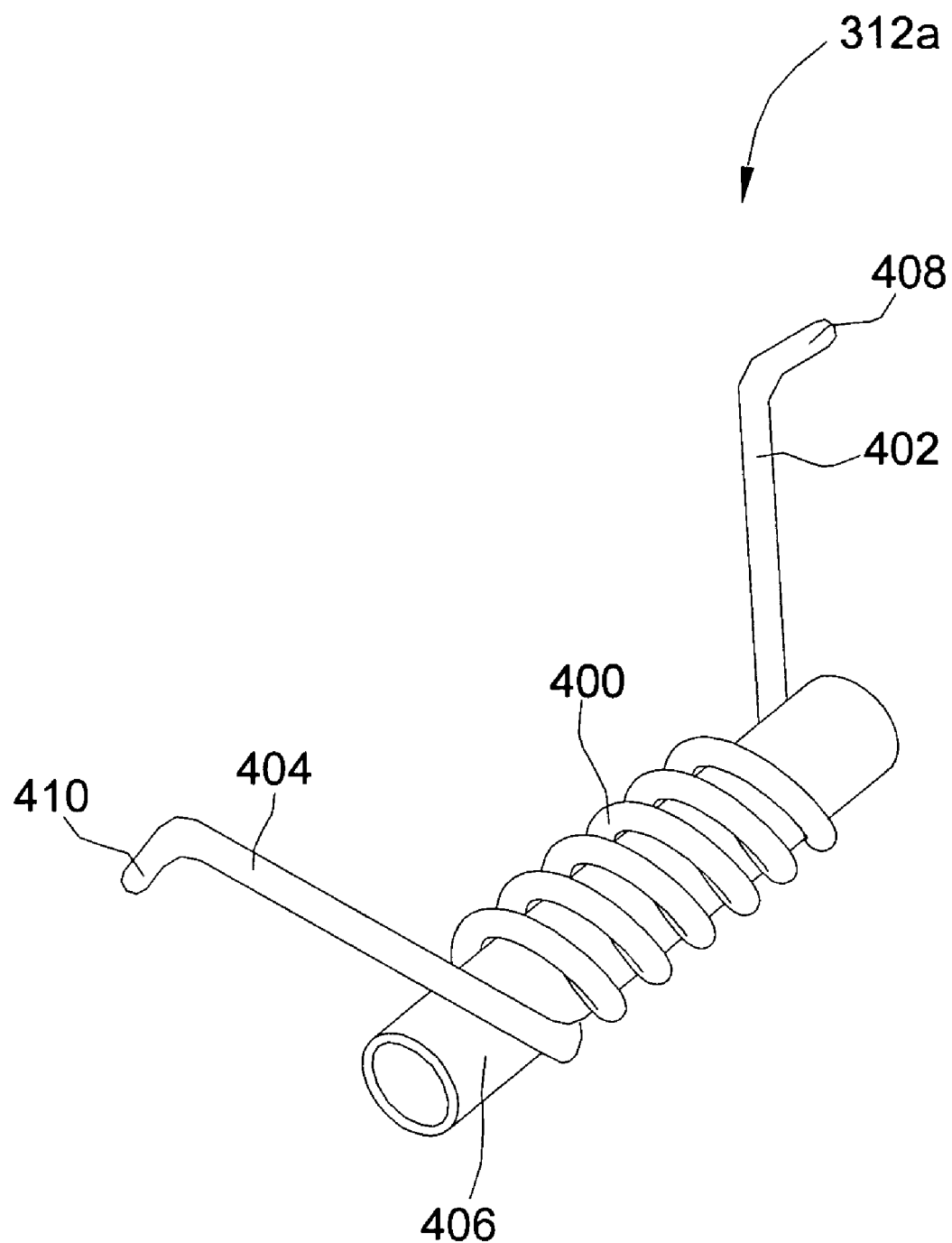
FIG. 3B is a perspective view of the force-providing element of the first embodiment of the present invention, the force-providing element including a spacing element.

The force-providing element, shown in FIG. 3B, may further include a spacing element 406 in the shape of a hollow cylinder. The spacing element 406 is located between the guiding shaft 306 and the helical unit 400 for facilitating the movement of the guiding shaft 306 along the axle direction of the helical unit 400.

Figure 4:
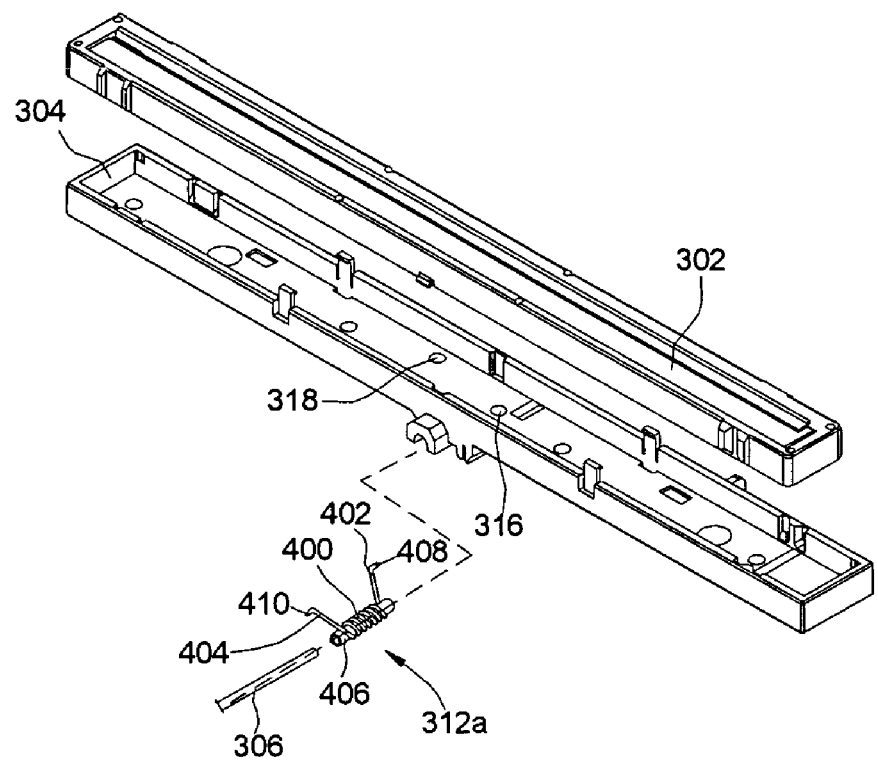
FIG. 4 is an explosive view of the first embodiment of the present invention.

FIG. 4 is an explosive view of the first embodiment that includes a spacing element 406 of the present invention. The structure of the first embodiment can be more clearly understood by referring to FIG. 2, FIG. 3A and FIG. 3B.

The present invention also provides another CIS scanner whose force-providing element includes an arc-shaped structure and an elastic part. The arc-shaped structure movably sits on the guiding shaft and the elastic part extends from an end of the helical unit for supporting the contact image sensor module to maintain the contact image sensor module at a constant distance from the window glass while the contact image sensor module moves.

Figure 5:
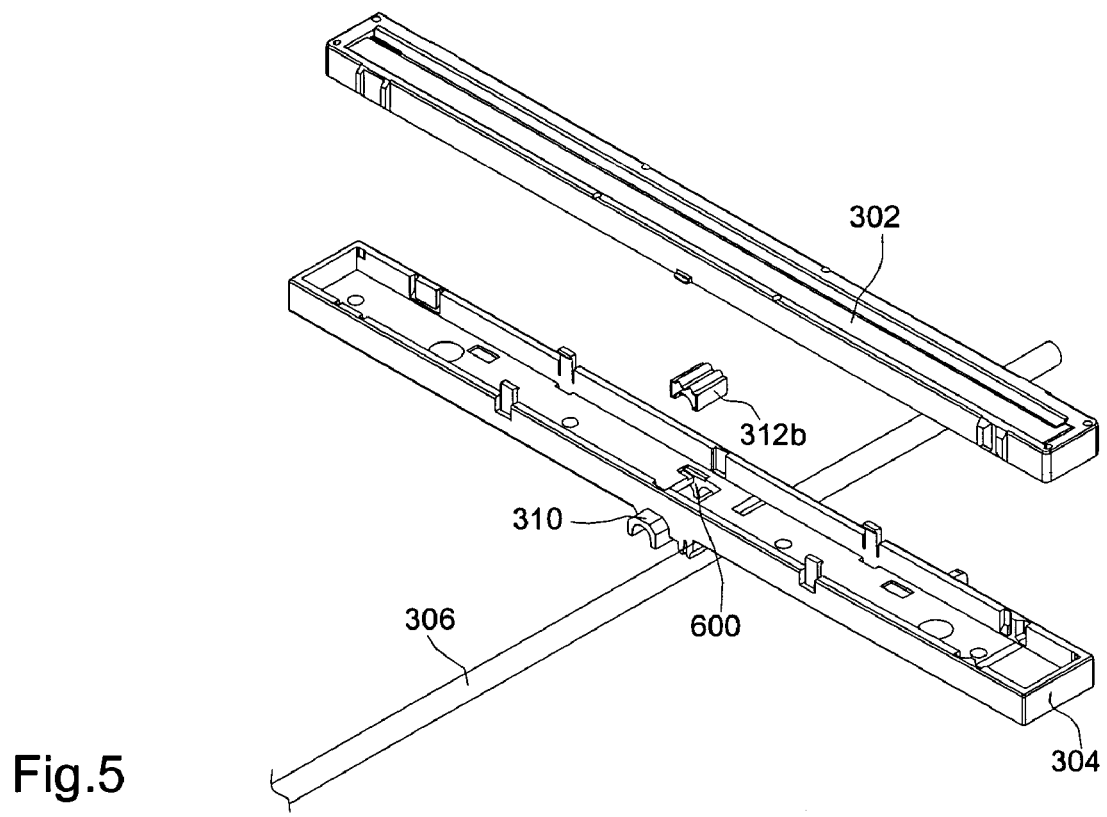
FIG. 5 is an explosive view of the second embodiment of the present invention.
Figure 6:
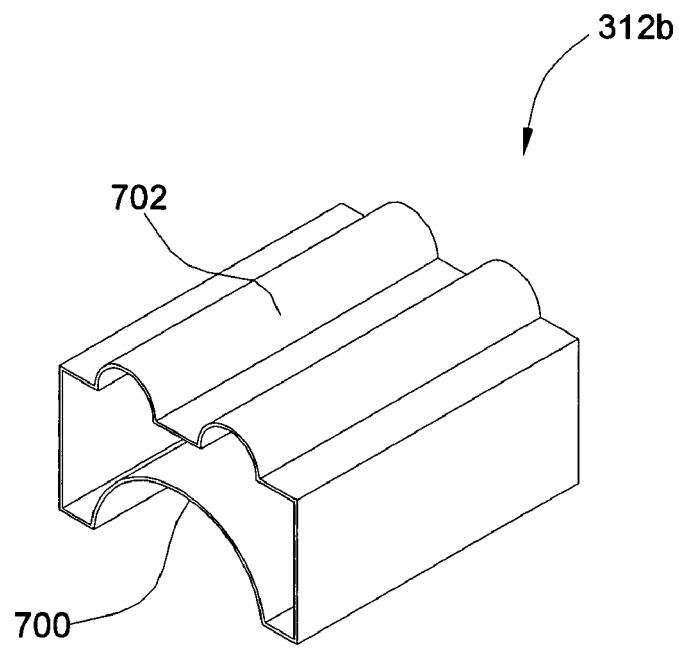
FIG. 6 is a perspective view of the force-providing element of the second embodiment of the present invention.

The second embodiment of the present invention is shown in FIG. 5. The carriage 304 includes a hole 600 that allows a force-providing element 312b to pass through for supporting the contact image sensor module 302. The force-providing element 312b in the second embodiment shown in FIG. 6 includes an arc-shaped structure 700 and a resilient element 702. The curvature of the arc-shaped structure 700 corresponds to that of the guiding shaft 306. The resilient element 702 passes through the hole 600 for supporting the contact image sensor module 302. Even though the horizontal movement of the carriage 304 may cause the carriage 304 and contact image sensor module 302 to vibrate, the elastic force provided by the resilient element 702 maintains the contact image sensor module 302 at a constant distance from the window glass 300 (not shown in FIG. 5) at all times to ensure the image to be scanned is within the limited focal distance. Unless otherwise mentioned, other components in the second embodiment are similar to those in the first embodiment.

Figure 7:
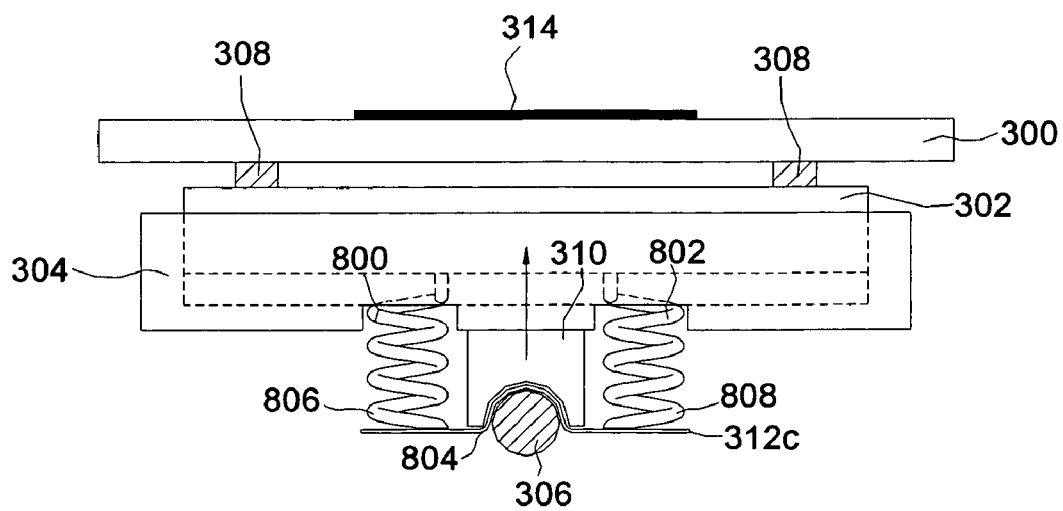
FIG. 7 is a side view of the third embodiment of the present invention.
Figure 8:
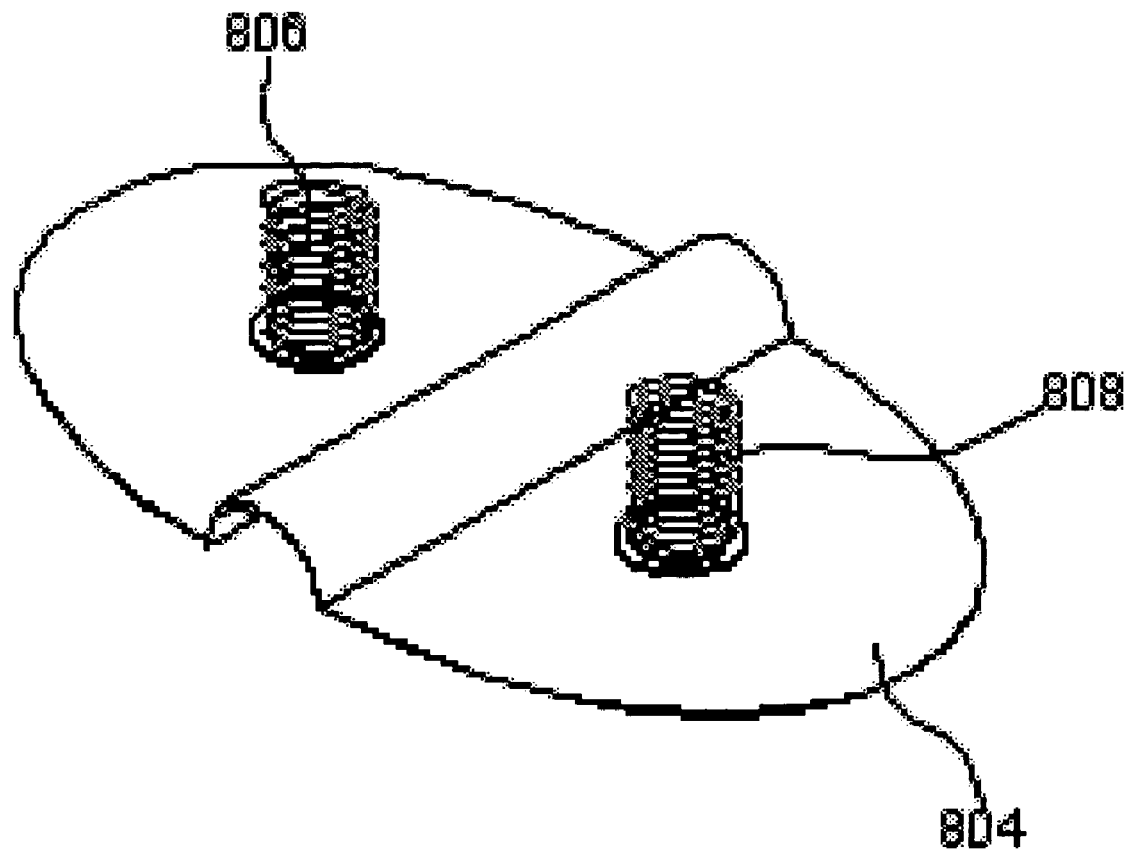
FIG. 8 is a perspective view of the force-providing element of the third embodiment of the present invention.

The third embodiment of the present invention is shown in FIG. 7. The carriage 304 includes two holes 800 and 802. The force-providing element 312c shown in FIG. 8 includes an arc-shaped structure 804 and two springs 806 and 808. Springs 806 and 808 respectively pass through holes 800 and 802 for supporting the contact image sensor module 302. Similarly, the elastic force provided by springs 806 and 808, in the direction shown in the figure, maintains the contact image sensor module 302 at a constant distance from the window glass 300 at all times when the carriage 304 moves horizontally. Unless otherwise mentioned, other components in the third embodiment are similar to those in the first embodiment.

By means of the detailed descriptions of what is presently considered to be the most practical and preferred embodiments of the subject invention, it is the expectation that the features and the gist thereof are plainly revealed. Nevertheless, these above-mentioned illustrations are not intended to be construed in a limiting sense. Instead, it should be well understood that any analogous variation and equivalent arrangement is to be protected and that the interpretation of the scope of the subject invention would therefore as much as broadly apply.

The invention claimed is:

1. A scanner, comprising:
    a window glass;
    a contact image sensor (CIS) module located below said window glass;
    a carriage for carrying said contact image sensor module, said carriage having a hole;
    a guiding shaft located below said carriage for guiding movement of said carriage; and
    a force-providing element for providing a force making said contact image sensor module to maintain a constant distance from said window glass while said contact image sensor module moves, the force-providing element comprising a portion sliding on said guiding shaft, the force-providing element further comprising an elastic part extended from the portion and passing through said hole and touching against said contact image sensor module.

2. The scanner of claim 1, further comprising a smooth element positioned between said contact image sensor module and said window glass for facilitating movement of the CIS module.

3. The scanner of claim 1, wherein said carriage further comprises a guiding element positioned on a bottom of said carriage for accommodating said guiding shaft.

4. The scanner of claim 1, wherein said force-providing element comprises a helical unit movably sleeved into said guiding shaft, and said elastic part is an extension unit from an end of the helical unit for supporting said contact image sensor module.

5. The scanner of claim 4, wherein said force-providing element further comprises a spacing element sleeved into said guiding shaft for facilitating movement of said guiding shaft along an axle direction of the helical unit.

6. The scanner of claim 4, wherein said force-providing element is a torsion spring.

7. The scanner of claim 1, wherein said force-providing element comprises an arc-shaped structure for seating on said guiding shaft, and said elastic part is a resilient element for supporting said contact image sensor module.

8. The scanner of claim 1, wherein said force-providing element comprises an arc-shaped structure for seating on said guiding shaft, and said elastic part is a coil spring for supporting said contact image sensor module.

9. A scanner, comprising:
    a window glass;
    a contact image sensor (CIS) module located below said window glass;
    a carriage for carrying said contact image sensor module, said carriage having a hole;
    a guiding shaft located below said carriage for guiding movement of said carriage;
    a smooth element positioned between said contact image sensor module and said window glass for facilitating movement of the CIS module;
    a guiding element positioned on a bottom of said carriage for accommodating said guiding shaft; and
    a force-providing element, comprising:
        a helical unit movably sleeved into said guiding shaft;
        an extension unit, from an end of the helical unit for supporting said contact image sensor module to render said contact image sensor module to maintain a constant distance from said window glass while said contact image sensor module moves; and a spacing element sleeved into said guiding shaft for facilitating movement of said guiding shaft along an axle direction of the helical unit.

10. The scanner of claim 9, wherein said force-providing element is a torsion spring.

11. A scanner, comprising:
a window glass;
a contact image sensor (CIS) module located below said window glass;
a carriage for carrying said contact image sensor module, said carriage having a hole;
a guiding shaft located below said carriage for guiding movement of said carriage;
a smooth element positioned between said contact image sensor module and said window glass for facilitating movement of the CIS module;
a guiding element positioned on a bottom of said carriage for accommodating said guiding shaft; and
a force-providing element, comprising:
an arc-shaped structure movably seating and sliding on said guiding shaft; and
an elastic part having a first end in touch with said arc-shaped structure and a second end passing through said hole and touching against said contact image sensor module for supporting said contact image sensor module to render said contact image sensor module to maintain a constant distance from said window glass while said contact image sensor module moves.

12. The scanner of claim 11, wherein said elastic part comprises a resilient element.

13. The scanner of claim 11, wherein said elastic part comprises a coil spring.

* * * * *